(12) United States Patent
Billore et al.

(10) Patent No.: US 11,075,979 B2
(45) Date of Patent: Jul. 27, 2021

(54) OPTIMIZED RESOURCE PROVISIONING

(71) Applicant: International Business Machines Corporation, Armonk, NY (US)

(72) Inventors: Ashish Billore, Bangalore (IN); Sudheesh S. Kairali, Kozhikode (IN); Muthu A. Muthiah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1125 days.

(21) Appl. No.: 15/055,650

(22) Filed: Feb. 29, 2016

(65) Prior Publication Data
US 2017/0250918 A1 Aug. 31, 2017

(51) Int. Cl.
G06F 15/16 (2006.01)
H04L 29/08 (2006.01)
G06F 3/06 (2006.01)
H04L 12/24 (2006.01)

(52) U.S. Cl.
CPC ............ H04L 67/10 (2013.01); G06F 3/0605 (2013.01); G06F 3/067 (2013.01); G06F 3/0631 (2013.01); H04L 41/5054 (2013.01); H04L 41/5096 (2013.01)

(58) Field of Classification Search
CPC .................................................. H04L 47/70
See application file for complete search history.

(56) References Cited

U.S. PATENT DOCUMENTS 8,543,556 B2  9/2013  Nagpal et al.
9,602,360 B1*  3/2017  Greenfield ............ G06F 9/5027
2003/0225982 A1*  12/2003  Fujita ..................... G06F 3/0652
  711/148
2007/0130214 A1*  6/2007  Boyd ................... G06F 11/1471
2012/0131176 A1*  5/2012  Ferris .................... G06F 9/5072
  709/224
2013/0318526 A1  11/2013  Conrad et al.
(Continued)

OTHER PUBLICATIONS

Liu et al., "Modeling the Impact of Disk Scrubbing on Storage System", Journal of Computers, vol. 5, No. 11, Nov. 2010, © 2010 Academy Publisher, doi:10.4304/jcp.5.11.1629-1637, 9 pages.

(Continued)

Primary Examiner — Kevin T Bates
Assistant Examiner — Clarence D McCray
(74) Attorney, Agent, or Firm — Stephanie L. Carusillo

(57) ABSTRACT

As disclosed herein a computer-implemented method includes providing a plurality of resource allocation zones corresponding to a plurality of resource preparation operations, receiving a request from a requester for a resource, determining a selected resource allocation zone for a tenant from the plurality of resource allocation zones, and determining a resource usage pattern from historical usage data corresponding to the tenant. The method further includes provisioning the requested resource from the selected resource allocation zone based on the resource usage pattern, executing a resource preparation operation corresponding to the selected resource allocation zone in conjunction with provisioning the requested resource, and providing the requested resource to the tenant. A computer program product and a computer system corresponding to the above method are also disclosed herein.

20 Claims, 7 Drawing Sheets

(56) References Cited

U.S. PATENT DOCUMENTS

| | | | | |
|---|---|---|---|---|
| 2014/0059228 A1* | 2/2014 | Parikh | ............... | H04L 67/42 709/226 |
| 2015/0012651 A1* | 1/2015 | Tung | ............... | G06F 9/5072 709/224 |
| 2015/0067171 A1* | 3/2015 | Yum | ............... | G06F 9/5072 709/226 |
| 2015/0373111 A1* | 12/2015 | Fukui | ............... | G06F 3/0605 709/213 |

OTHER PUBLICATIONS

Mell et al., "The NIST Definition of Cloud Computing", NIST National Institute of Standards and Technology U.S. Department of Commerce, Special Publication 800-145, Sep. 2011, 7 pages.

Oprea et al., "A Clean-Slate Look at Disk Scrubbing", Feb. 2010 FAST'10: Proceedings of the 8th USENIX conference on File and storage technologies Publisher: USENIX Association, 14 pages.

\* cited by examiner

OPTIMIZED RESOURCE PROVISIONING

BACKGROUND

The present invention relates to provisioning requests for resources, and more particularly to optimizing the operation of provisioning requests for resources, such as cloud resources.

With the continual growth of digital information in the world, there is an ever increasing reliance on cloud computing (e.g., on-demand computing). Cloud computing is a model for enabling convenient, on-demand network access to a shared pool of configurable computing resources (e.g., servers, storage, applications and services) that can be rapidly provisioned and released with minimal management effort. The availability of low-cost computers and storage devices, as well as, the widespread adoption of hardware virtualization and service-oriented architecture have led to a growth in cloud computing. The scalability offered by cloud computing enables corporations to scale up as computing needs increase and then scale down again as demands decrease.

SUMMARY

As disclosed herein a computer-implemented method includes providing a plurality of resource allocation zones corresponding to a plurality of resource preparation operations, receiving a request from a requester for a resource, determining a selected resource allocation zone for a tenant from the plurality of resource allocation zones, and determining a resource usage pattern from historical usage data corresponding to the tenant. The method further includes provisioning the requested resource from the selected resource allocation zone based on the resource usage pattern, executing a resource preparation operation corresponding to the selected resource allocation zone in conjunction with provisioning the requested resource, and providing the requested resource to the tenant. A computer program product and a computer system corresponding to the above method are also disclosed herein.

DETAILED DESCRIPTION

Figure 1:
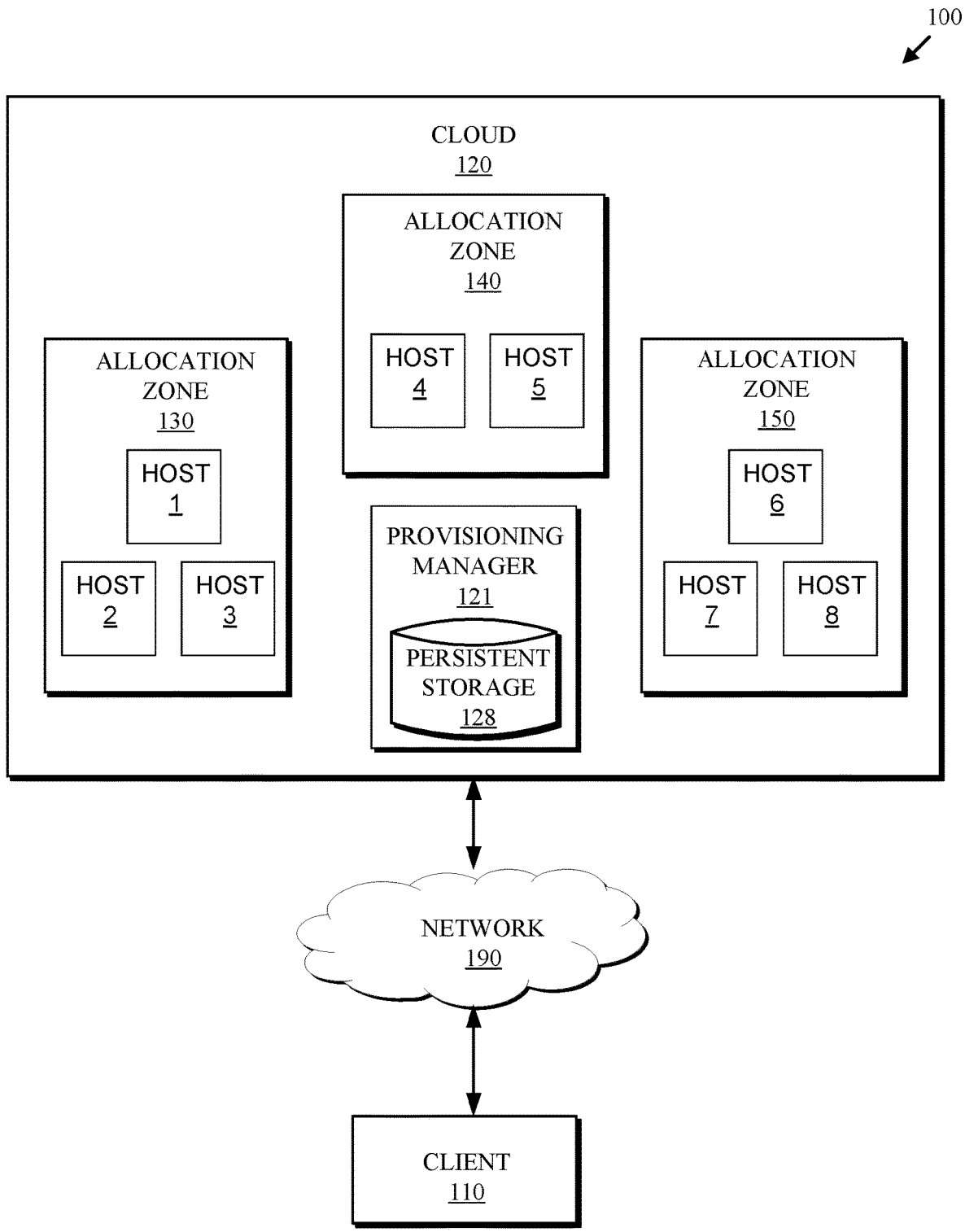
FIG. 1 is a functional block diagram depicting a computing environment, in accordance with at least one embodiment of the present invention.

Corporations rely on computers to manage and maintain many aspects of their day to day business operations. To manage fluctuating computing resource requirements, corporations may take advantage of cloud computing offerings. Using cloud computing resources may enable a corporation to obtain additional computing resources when demand increases, and then subsequently release the additional resources when demand declines.

When a corporation determines a need to request resource from a cloud environment, placing the request may be as simple as identifying the required resource (e.g., a 50 Gig file system), and asking a cloud resource provider for the resource. Upon receiving the resource request, determining what activities or operations will be performed on the requested resource during a provisioning operation may be left to the cloud environment (e.g. the cloud resource provider). Possible activities may include, but are not limited to, data erasure (e.g., overwriting any existing data), disk or data scrubbing (e.g., detecting and potentially correcting errors on a disk), or installing software (e.g., installing an operating system, or a database). Performing these activities may be very time consuming and result in unexpected expenses for the tenant. Even though these activities may be necessary or at least beneficial for the tenant, the activities are often not apparent to the requester when the initial request for a cloud resource is initiated. Often, the requester has little or no input in determining which activities are performed, or to what degree an activity is performed (e.g., what degree of erasure is performed on a requested resource).

The embodiments disclosed herein recognize that requesters of cloud resources should have visibility to available provisioning actions, and the requesters should be able to determine the provisioning actions for which they are willing to pay. Enabling the tenant to decide which provisioning actions are to be executed removes, from the cloud environment, the responsibility of determining provisioning actions without input from the tenant. The present invention leverages the above observations and will now be described in detail with reference to the Figures.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

FIG. 1 is a functional block diagram depicting a computing environment 100, in accordance with at least one embodiment of the present invention. Computing environment 100 includes tenant 110 and cloud 120 that communicate with each other over network 190. When tenant 110 determines a requirement for additional computer resources, the client can request the required resources from cloud 120.

Cloud 120 includes provisioning manager 121, and allocation zones 130, 140, and 150. Each allocation zone includes a collection of one or more hosts: allocation zone 130 includes host 1, host 2, and host 3; allocation zone 140 includes host 4 and host 5; and allocation zone 150 includes host 5, host 7, and host 8. A host may be a computing device that can be virtualized as virtual machines (VMs) or containers. Tenant 110 and hosts (1-8) can be computing devices such as smart phones, tablets, desktop computers, laptop computers, specialized computer servers, or the like that are capable of processing instructions and communicating over network 190.

Each allocation zone can be comprised of hosts that are configured to execute a predetermined resource preparation operation. The predetermined resource preparation operation may be part of a provisioning operation that is executed prior to fulfilling a resource request. In some embodiments, the predetermined resource preparation operation includes actions that are not executed until the tenant releases the resource (e.g., a resource that was used as a file system is completely overwritten to prevent residual content from being visible to the next tenant to be assigned the resource). The resource preparation operation may include one or more actions, for example, data erasure (also called data clearing or data wiping), disk scrubbing (error detection) or other actions familiar to those with skill in the art.

Provisioning manager 121 may be configured to monitor and manage resource requests for cloud resources directed to cloud 120. Provisioning manager 121 manages allocation zones 130, 140 and 150, and is aware of be the predetermined resource preparation operations corresponding to allocation zones 130, 140 and 150. Additionally, provisioning manager 121 may collect and maintain historical usage data corresponding to each tenant that requests resource from cloud 120. The historical usage data may include, but is not limited to, (i) the size of the resource requested; (ii) the allocation zone used; (iii) the amount/percentage of the resource used; (iv) how long the resource was retained; and (v) repeat requests for the same or similar resource. The collected (historical) data may be retained on persistent storage 128 in a file system, database or some other means familiar to those of skill in the art.

The historical data may be used to determine a cloud resource usage pattern. Resource preparation operation can be resource (e.g., processor) intensive and require a long time to complete (i.e., time consuming). Detecting a usage pattern may enable provisioning manager 121 to more efficiently provision a requested resource for a tenant. For example, provisioning manager 121 may detect a tenant that requests a resource for two months, releases the resource for a week, and then requests a similar or identical resource for another 2 months. Rather than continually provisioning a new resource each time, provisioning manager 121 may retain the resource and provide the same resource for follow-on requests, and avoid some of resource preparation operations.

In the depicted embodiment, provisioning manager 121 is separated from allocation zones 130, 140 and 150. In other embodiments, provisioning manager 121 is contained on a host (e.g., host 1). In another embodiment, provisioning manager 121 is a web application remotely located and communicates with cloud 120 and manages allocation zones 130, 140 and 150 via network 190. Provisioning manager 121 includes persistent storage 128. Persistent storage 128 may be any non-volatile storage device or media known in the art. For example, persistent storage 128 can be implemented with a tape library, optical library, solid state storage, one or more independent hard disk drives, or multiple hard disk drives in a redundant array of independent disks (RAID). Similarly, data on persistent storage 128 may conform to any suitable storage architecture known in the art, such as a file, a relational database, an object-oriented database, and/or one or more tables.

Tenant 110, cloud 120, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between tenant 110 and cloud 120 in accordance with at least one embodiment of the present invention.

Figure 2:
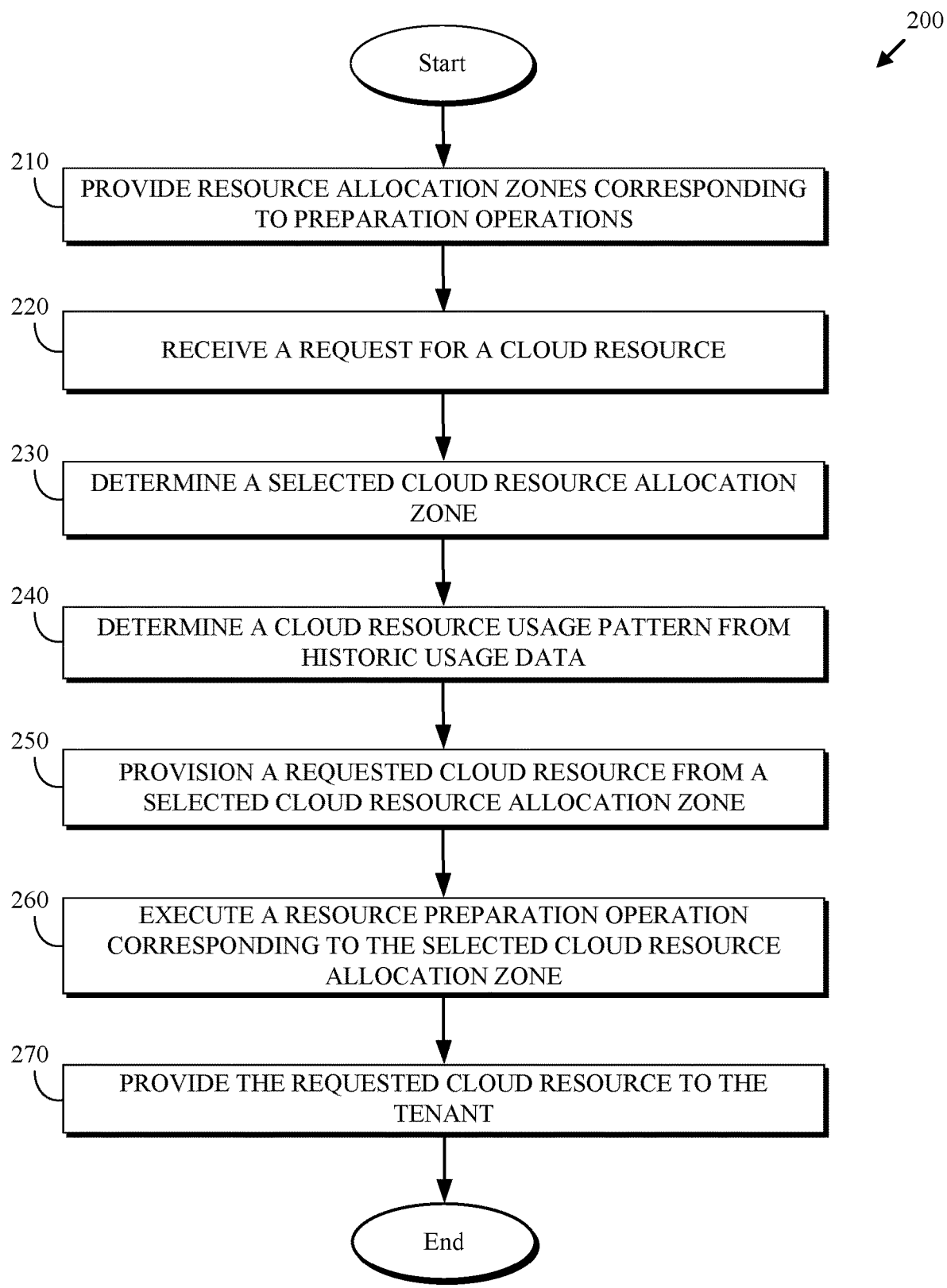
FIG. 2 is a flowchart depicting a cloud resource provisioning method, in accordance with at least one embodiment of the present invention.

FIG. 2 is a flowchart depicting cloud resource provisioning method 200, in accordance with at least one embodiment of the present invention. As depicted, cloud resource provisioning method 200 includes providing (210) resource allocation zones, receiving (220) a request for a cloud resource, determining (230) a selected cloud resource allocation zone, determining (240) a cloud resource usage pattern, provisioning (250) a requested cloud resource, executing (260) a resource preparation operation, and providing (270) the requested cloud resource to the tenant. Cloud resource provisioning method 200 enables provisioning manager 121 to efficiently optimize cloud provisioning operations.

Providing (210) resource allocation zones (hereinafter allocation zones) may include provisioning manager 121 identifying hosts within cloud environment that include a common set of preparation operations. Hosts that execute a common set of preparation operations can be logically grouped into an allocation zone (e.g., allocation zones 130, 140, and 150). For example, (i) each host in allocation zone 130 may execute a triple pass data erasure operation to assure a sterile resource; (ii) each host in allocation zone 140 may execute a disk scrubbing operation to detect and either repair or avoid use of portions of the resource where errors are detected; and (iii) each host in allocation zone 150 may execute both a single pass erasure operation and a disk scrubbing operation. Any resource provisioned from an allocation zone will be subject to the resource preparation operations corresponding to the allocation zone.

In some embodiments, a data erasure operation (e.g., the data erasure operation of allocation zone 130 or 150) is executed when the requested resource is provisioned and provided to a tenant. In other embodiments, the data erasure operation is executed when the resource is released to cloud 120. In some embodiments, a host must continue provide the preparation operations that are identified as being offered by allocation zone of which the host is a member until provisioning manager 121 performs a restructuring operation to reorganize and balance hosts within allocation zones. In other embodiment, the preparation operations performed by the host can be altered, and as a result of the altered operations, provisioning manager 121 immediately restructures the allocation zones to accurately reflect the preparation operations performed by the host. Provisioning manager 121 can add the host to an existing allocation zone matching the altered operations, or provisioning manager 121 can create a new allocation zone for the host.

Receiving (220) a request for a cloud resource may include provisioning manager 121 receiving from tenant 110 a request for one or more cloud resources. The request may be initiated from tenant for which the request is being made (e.g., tenant 110). Alternatively, the request may be initiated by a requester from a computing device on behalf of tenant 110. In some embodiments, provisioning manager 121 performs authentication and authorization operations to verify the identity and authorities of the requester. In other embodiments, authentication and authorization is provided by an external provider and the request is known to be authentic and valid. In some embodiments, provisioning manager 121 collects and retains historical data corresponding to the tenant for which the resource request is being made. The data may include tenant identification, the type of resource requested, and date of the request. The historical data may be stored on persistent storage 128 to enable access for data retrieval and/or data update during resource provisioning or release operations.

Determining (230) a selected cloud resource allocation zone (hereinafter selected allocation zone) may include provisioning manager 121 determining whether the requested cloud resource is similar to a resource that was previously requested by the tenant. If a similar resource has been previously requested by the tenant, then provisioning manager 121 may determine the selected allocation zone to be the same allocation zone as was used for the previous resource request. Provisioning manager 121 may analyze historical data corresponding to the tenant to determine whether a resource request is similar to a previous request corresponding to the tenant.

If analysis of historical data reveals that the requested resource has not been previously used by the tenant, then provisioning manager 121 may enable the requester to select the resource allocation zone from which the requested resource should be provisioned. The requester can select the resource allocation zone, however, the requester may be unaware of what hosts are included in the resource allocation zones. When choosing a resource allocation zone, the requester may compare resource preparation operations corresponding to each resource allocation zone, and select the resource allocation zone that includes preparation operations meeting the expectations/requirements of the requester. In some embodiments, provisioning manager 121 maintains a profile corresponding to the tenant, and the profile includes a default selected allocation zone that is provided to provisioning manager 121 as the selected allocation zone for the current resource request.

Determining (240) a cloud resource usage pattern may include provisioning manager 121 retrieving and analyzing historical data corresponding to a tenant. In some embodiments, provisioning manager 121 continually monitors usage/consumption of resources requested by the tenant, and retains the historical usage data on persistent storage 128. In other embodiments, an external monitor observes usage/consumption, and the observations and retains the historical usage data on persistent storage 128. In some embodiments, provisioning manager 121 retrieves and analyzes historical data corresponding to the tenant. The analysis may detect identifiable usage patterns. For example, detected usage patterns may identify: (i) tendencies for the tenant to use only a small percentage of the requested resource; (ii) tendencies for the tenant to use a large percentage of the requested resource; (iii) tendencies for the tenant to completely consume the requested resource and then request additional resource; (iv) tendencies for the tenant to release a resource after one month of usage; or (v) tendencies for the tenant to retain a resource for greater than 6 months.

Provisioning (250) a requested cloud resource may include provisioning manager 121 preparing a requested resource for a tenant within the selected allocation zone. Depending on the type (or types) of resource being requested, provisioning manager 121 may use services available in cloud 120 to provide each requested resource. For example, if a request includes a 20 Gig VM running an AIX® OS, then provisioning manager 121 may use a "Computer Service" to prepare the requested VM resource. However, if a request includes 50 Gig of storage for a file system, then provisioning manager 121 may use a "Storage Service" to prepare the requested resource. In some embodiments, a request is can contain only a single resource request, and obtaining multiple resources requires submitting multiple requests. In other embodiments, multiple resources can be requested in a single resource request. When multiple resources are identified in a single resource request, the resource request may appear to the requester to be processed as a single transaction. However, each resource will be provisioned as a unique transaction by provisioning manager 121. In some embodiments, multiple transactions within a single request are processed in parallel, thus reducing turnaround time for the request.

Executing (260) a resource preparation operation may include provisioning manager 121 instructing the host (or hosts) from which the requested resource was provisioned to execute predefined actions on the provisioned request. In some embodiments, the resource preparation operation includes actions that are preformed prior to the requested resource being provided to the tenant. For example, checking for errors (e.g., disk scrubbing) on the provisioned resource and OS installation. In some embodiments, the resource preparation operation includes actions that are scheduled to be performed while the tenant is using the resource. For example, checking for and correcting errors (e.g., disk scrubbing) on the resource during periods of low activity. In some embodiments, the resource preparation operation includes actions that are scheduled to be performed after the tenant releases the resource. For example, performing data erasure to prevent accidental data disclosure to a subsequent tenant.

Providing (270) the requested cloud resource to the tenant may include provisioning manager 121 enabling the tenant to access (e.g., connect to) the requested cloud resource. Enabling access may include providing access information to the requester or tenant. Access information may include resource specifications, resource location, and connection instructions including an administrator userid and password. The requester or tenant may be aware of the allocation zone from which the requested resource was provisioned, however, the requester or tenant are not aware of the host within the allocation zone that is providing the requested resource. Additionally, provisioning manager 121 may provide, to the requestor, an itemized list of resource preparation operations that have been executed, are ongoing, and/or will execute when the resource is released. In some embodiments, the itemized list of resource preparation operations includes charges corresponding to each of the operations. In other embodiments, the itemized list of resource preparation operations is provided, but charges for resource preparation operations are included during a normal billing operation.

Requiring a requester to select a specific allocation zone enables the requester to be aware of resource preparation operations that will be executed, and for which he will eventually be billed. Providing an itemized listing of resource preparation operations provides added visibility to what operations are being performed on a requested resource, and additionally, may provide more granular billing information and insight to the requester.

Figure 3:
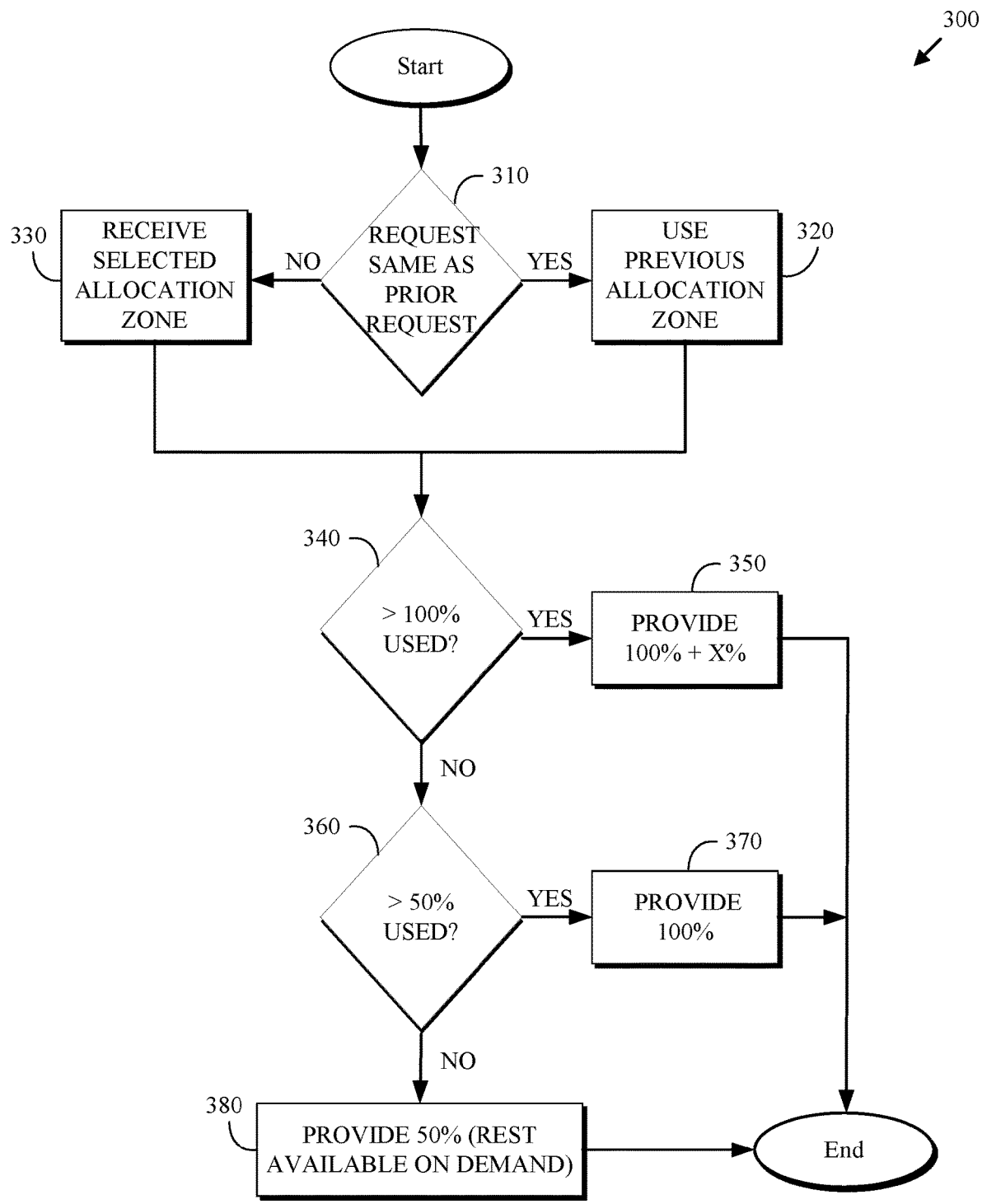
FIG. 3 depicts an example method using historic information to efficiently provision cloud resources, in accordance with at least one embodiment of the present invention.

FIG. 3 depicts example method 300 using historic information to efficiently provision cloud resources, in accordance with at least one embodiment of the present invention. In example method 300, historic information (data) that includes using use/consumption statistics corresponding to a tenant to determine an efficient and optimized provisioning operation specific to the tenant for which a cloud resource is being requested. As depicted, example method 300 includes determining (310) whether the request is the same as a prior request, using (320) a previous allocation zone, receiving (330) a selected allocation zone, determining (340) whether the tenant historically requires additional resource, providing (350) the requested resource plus additional resource, determining (360) whether the tenant historically used more than half of the requested resource, providing (370) the requested resource, and providing (380) half of requested resource. Upon receiving a request for a cloud resource, provisioning manager 121 may perform example method 300 to determine an efficient and optimized provisioning operation based on historic data corresponding to the tenant for which the request is made.

Determining (310) whether the request is the same as a prior request may include provisioning manager 121 analyzing historic data corresponding to the tenant for which the request is made. If provisioning manager 121 detects a duplicate or similar request in the historical data, then example method 300 proceeds to the using (320) a previous allocation operation. Otherwise, example method 300 proceeds to the receiving (330) a selected allocation zone operation.

Using (320) a previous allocation zone may include provisioning manager 121 analyzing historic data corresponding to the duplicate or similar request to identify the allocation zone corresponding to the duplicated or similar request and set the identified allocation zone as the selected allocation zone for the current request.

Receiving (330) a selected allocation zone may include provisioning manager 121 requiring the requester of the resource to identify (select) the allocation zone to be used for the current request. In some embodiments, a tenant profile includes a default selected allocation zone, and the default allocation zone is provided to the requester as a suggestion when the requester is selecting an allocation zone. In other embodiments, a tenant profile includes a default selected allocation zone, and the default allocation zone is automatically provided as the selected allocation zone for the current resource request.

Determining (340) whether the tenant historically requires additional resource may include provisioning manager 121 analyzing historic data corresponding to the tenant for which the request is made to identify resource usage/consumption patterns. If the analysis of the historic data identifies a pattern indicating that the tenant typically consumes the entire requested resource and then requests additional resource (i.e., >100% of the requested resource is historically needed), then example method 300 proceeds to provide operation 350. Otherwise, example method 300 proceeds determine operation 360.

Providing (350) the requested resource plus additional resource may include provisioning manager 121 automatically increasing the size of the requested resource by a predetermined amount. In some embodiments, the increased size is a percentage (e.g., 10%) of the requested resource. In other embodiments, the increased size is a default size (e.g., 1 Gig). The increased resource is provisioned and required resource preparation operations are executed on the entire resource before the increased resource is provided to the tenant.

Determining (360) whether the tenant historically used more than half of the requested resource may include provisioning manager 121 analyzing historic data corresponding to the tenant for which the request is made to identify resource usage/consumption patterns. If the analysis of the historic data identifies a pattern indicating that the tenant typically consumes more than half of the requested resource (i.e., >50% of the requested resource is historically needed), then example method 300 proceeds to provide operation 370. Otherwise, example method 300 proceeds provide operation 380.

Providing (370) the requested resource may include provisioning manager 121 provisioning performing standard provisioning and preparation operations on the requested resource. The requested resource is provided to the tenant after resource preparation operations are executed on the entire requested resource.

Providing (380) half of requested resource may include provisioning manager 121 provisioning the entire requested resource, but only performing resource preparation operations on half of the requested resource. The entire resource is provided to the tenant, however only half of the resource is usable. In some embodiments, when the tenant consumes 75% of the usable resource, preparation operations are performed on an additional portion of the unusable resource making that portion usable by the tenant.

Example method 300 enables provisioning manager 121 to use historic data to determine an efficient and optimized provisioning operation for a tenant. The efficient operation may be beneficial to both the tenant, and cloud 120. Preparation operation can be time consuming and costly (e.g., resource intensive). Tenants that do not historically use a majority of a requested resource, may receive access to a requested resource more quickly because only a portion of the requested resource is prepared and usable when the provisioned resource is made available to the tenant. Only performing preparation operations on a portion of the resource enables provisioning manager 121 to spend the saved time and resource processing additional resource requests. If provisioning manager 121 automatically increases a request size for a tenant that historically requires additions to requested resources, then the tenant may not be subject to requesting additional resource. Additionally, provisioning manager 121 may avoid any added processing overhead of processing an additional request.

Figure 4:
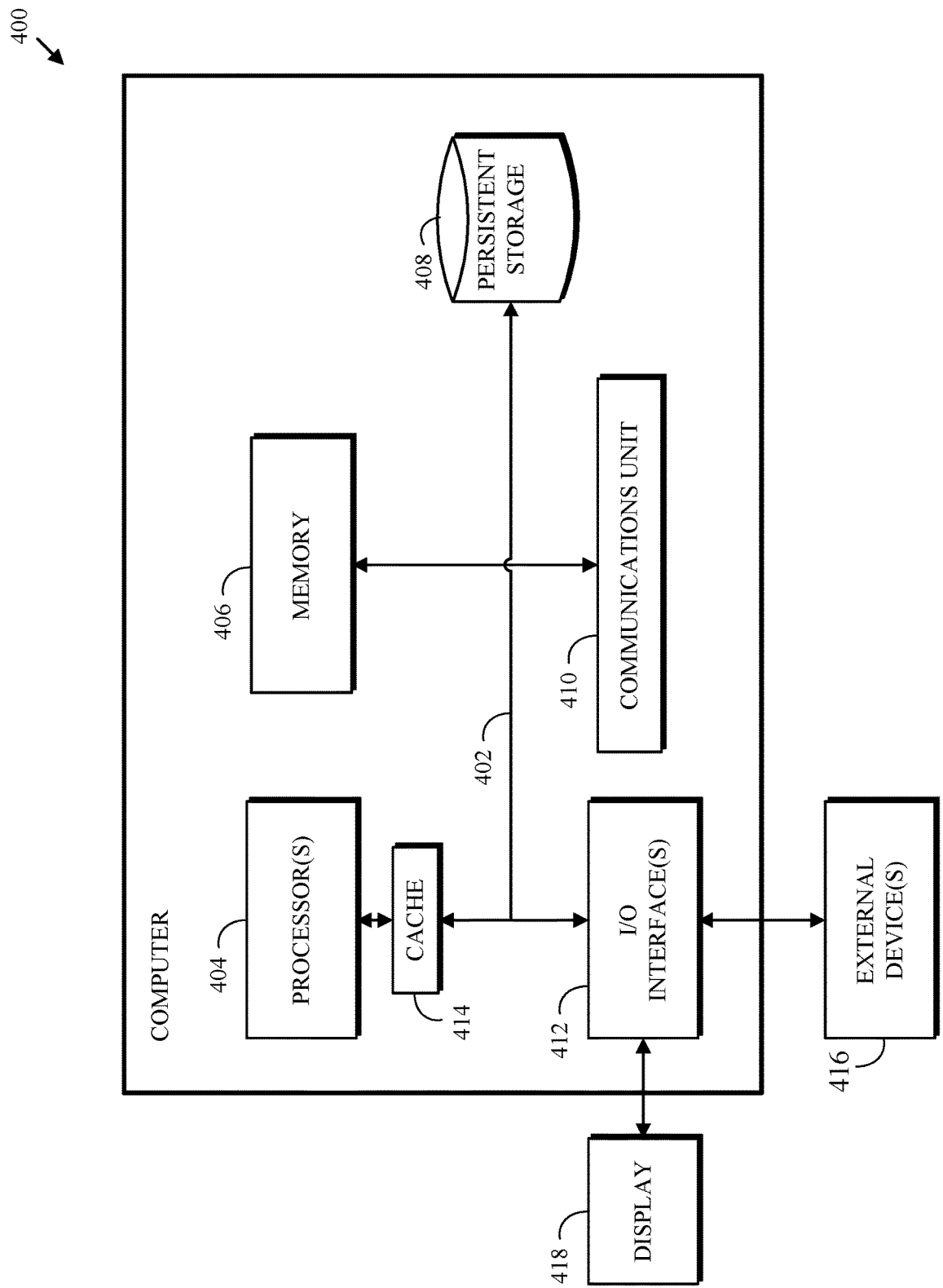
FIG. 4 is a functional block diagram depicting various components of one embodiment of a computer suitable for executing the methods disclosed herein.

FIG. 4 depicts a functional block diagram of components of a computer system 400, which is an example of systems such as tenant 110 and hosts (1-8) within computing environment 100 of FIG. 1, in accordance with at least one embodiment of the present invention. It should be appreciated that FIG. 4 provides only an illustration of one implementation and does not imply any limitations with regard to the environments in which different embodiments can be implemented. Many modifications to the depicted environment can be made.

Tenant 110 and hosts (1-8) include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., cloud resource provisioning method 200 and example method 300 are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of tenant 110 and hosts (1-8). In these examples, communications unit 410 includes one or more network interface cards. Communications unit 410 may provide communications through the use of either or both physical and wireless communications links. Program instructions and data used to practice embodiments of cloud resource provisioning method 200 and example method 300 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
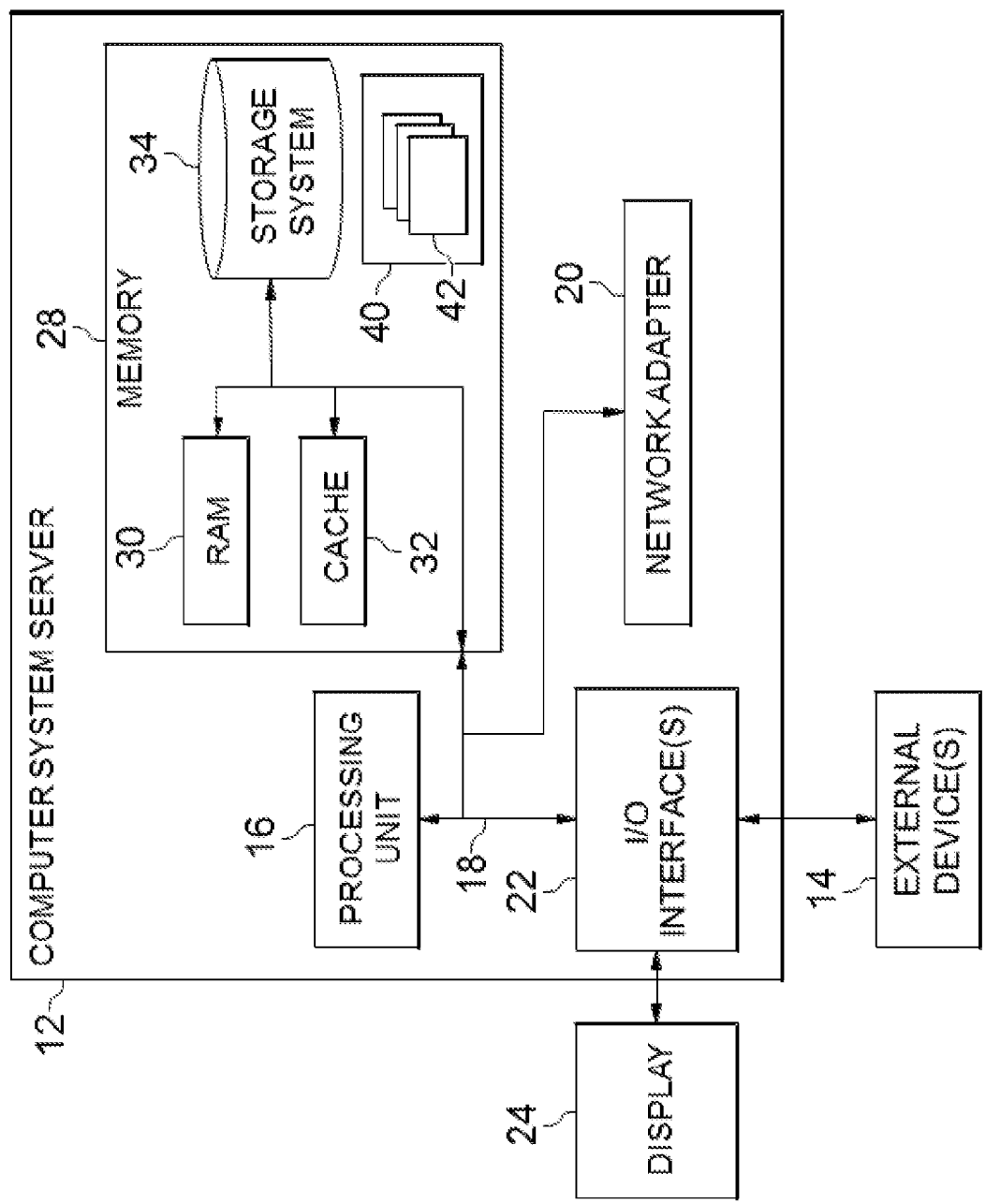
FIG. 5 is a block diagram depicting a cloud computing node, according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
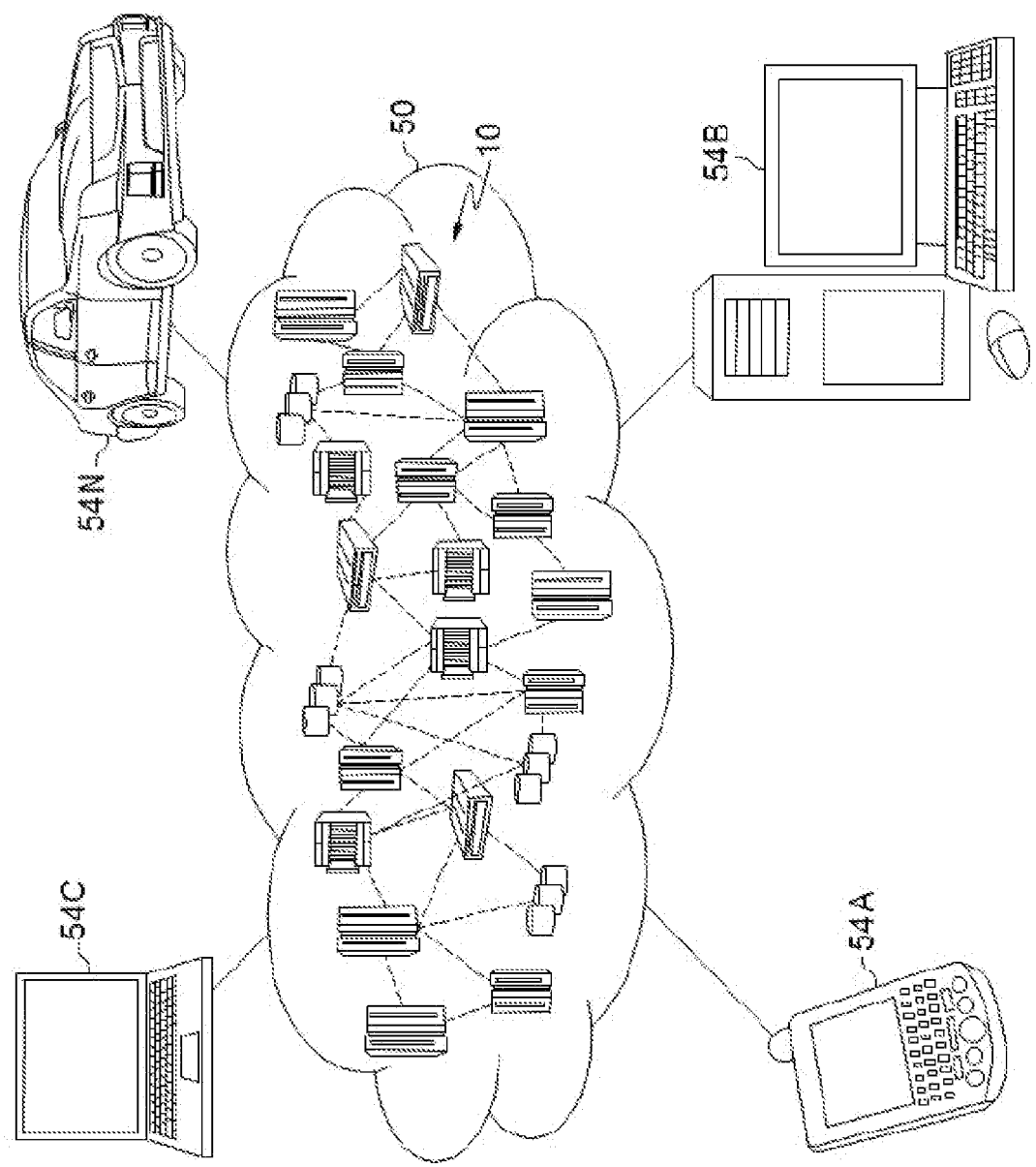
FIG. 6 is a schematic diagram depicting a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
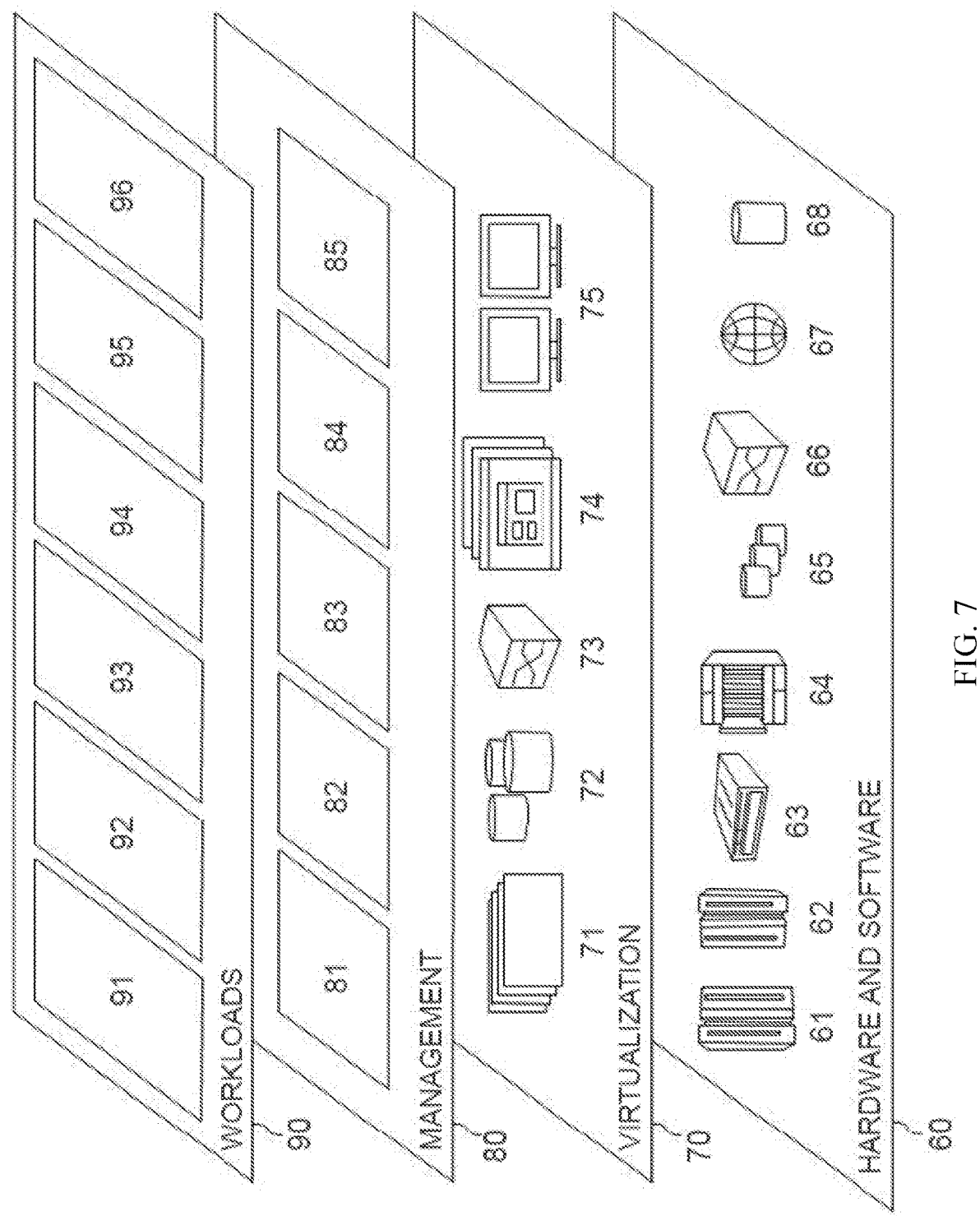
FIG. 7 is a schematic diagram depicting abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer implemented method comprising the steps of:
providing a plurality of resource allocation zones wherein each of the plurality of resource allocation zones is comprised of one or more hosts, and wherein each of the plurality of resource allocation zones corresponds to a predetermined resource preparation operation, and wherein the one or more hosts within a particular resource allocation zone are configured to execute the predetermined resource preparation operation corresponding to the particular resource allocation zone;
determining a selected resource allocation zone for a tenant from the plurality of resource allocation zones;
determining a resource usage pattern from historical usage data corresponding to the tenant;
provisioning the requested resource from the selected resource allocation zone based on the resource usage pattern;
executing a resource preparation operation corresponding to the selected resource allocation zone in conjunction with provisioning the requested resource; and
providing the requested resource to the tenant.

2. The method of claim 1, wherein determining the selected resource allocation zone for the tenant comprises determining whether the requested resource was previously used by the tenant.

3. The method of claim 2, further comprising enabling the requester to indicate the selected resource allocation zone responsive to determining that the requested resource was not previously used by the tenant.

4. The method of claim 2, wherein the selected resource allocation zone corresponds to a previous resource request.

5. The method of claim 1, further comprising informing the tenant of the resource preparation operation corresponding to the selected resource allocation zone.

6. The method of claim 5, further comprising informing the tenant of a cost corresponding to the resource preparation operation.

7. The method of claim 1, wherein the resource preparation operation includes performing a disk scrubbing operation.

8. The method of claim 1, wherein the requested resource is a cloud resource.

9. A computer program product comprising:
one or more computer readable storage media and program instructions stored on the one or more computer readable storage media, the program instructions comprising instructions executable by a computer to perform:
providing a plurality of resource allocation zones wherein each of the plurality of resource allocation zones is comprised of one or more hosts, and wherein each of the plurality of resource allocation zones corresponds to a predetermined resource preparation operation, and wherein the one or more hosts within a particular resource allocation zone are configured to execute the predetermined resource preparation operation corresponding to the particular resource allocation zone;
receiving a request from a requester for a requested resource;
determining a selected resource allocation zone for a tenant from the plurality of resource allocation zones;
determining a resource usage pattern from historical usage data corresponding to the tenant;
provisioning the requested resource from the selected resource allocation zone based on the resource usage pattern;
executing a resource preparation operation corresponding to the selected resource allocation zone in conjunction with provisioning the requested resource; and
providing the requested resource to the tenant.

10. The computer program product of claim 9, wherein the instructions for determining the selected resource allocation zone for the tenant comprise instructions for determining whether the requested resource was previously used by the tenant.

11. The computer program product of claim 10, wherein the program instructions include instructions for enabling the requester to indicate the selected resource allocation zone responsive to determining that the requested resource was not previously used by the tenant.

12. The computer program product of claim 10, wherein the selected resource allocation zone corresponds to a previous resource request.

13. The computer program product of claim 9, wherein the program instructions include instructions for informing the tenant of the resource preparation operation corresponding to the selected resource allocation zone.

14. The computer program product of claim 13, wherein the program instructions include instructions for informing the tenant of a cost corresponding to the resource preparation operation.

15. The computer program product of claim 9, wherein the requested resource is a cloud resource.

16. A computer system comprising:
one or more computer processors;
one or more computer readable storage media;
program instructions stored on the computer readable storage media for execution by at least one of the computer processors, the program instructions comprising instructions to perform:
providing a plurality of resource allocation zones wherein each of the plurality of resource allocation zones is comprised of one or more hosts, and wherein each of the plurality of resource allocation zones corresponds to a predetermined resource preparation operation, and wherein the one or more hosts within a particular resource allocation zone are configured to execute the predetermined resource preparation operation corresponding to the particular resource allocation zone;
receiving a request from a requester for a requested resource;
determining a selected resource allocation zone for a tenant from the plurality of resource allocation zones;
determining a resource usage pattern from historical usage data corresponding to the tenant;
provisioning the requested resource from the selected resource allocation zone based on the resource usage pattern;
executing a resource preparation operation corresponding to the selected resource allocation zone in conjunction with provisioning the requested resource; and
providing the requested resource to the tenant.

17. The computer system of claim 16, wherein the instructions for determining the selected resource allocation zone for the tenant comprise instructions for determining whether the requested resource was previously used by the tenant.

18. The computer system of claim 17, wherein the program instructions include instructions for enabling the requester to indicate the selected resource allocation zone responsive to determining that the requested resource was not previously used by the tenant.

19. The computer system of claim 17, wherein the selected resource allocation zone corresponds to a previous resource request.

20. The computer system of claim 16, wherein the resource preparation operation is part of a provisioning operation that is executed prior to fulfilling a resource request and includes one or more actions selected from the group consisting of: a data erasure, a data clearing, a data wiping, and an error detection.

* * * * *